(12) United States Patent
Küther et al.

(10) Patent No.: US 6,354,329 B1
(45) Date of Patent: Mar. 12, 2002

(54) DEVICE FOR THE MAINTENANCE OF COMPRESSED AIR SYSTEMS

(75) Inventors: Ludwig Küther, Waldenbuch; Horst Schöllkopf, Stuttgart, both of (DE)

(73) Assignee: J. Lorch Gesellschaft & Co. GmbH, Waldenbuch (DE)

(*) Notice: Subject to any disclaimer, the term of this patent is extended or adjusted under 35 U.S.C. 154(b) by 0 days.

(21) Appl. No.: 09/701,415

(22) PCT Filed: May 26, 1999

(86) PCT No.: PCT/EP99/03636

§ 371 Date: Nov. 29, 2000

§ 102(e) Date: Nov. 29, 2000

(87) PCT Pub. No.: WO99/66213

PCT Pub. Date: Dec. 23, 1999

(30) Foreign Application Priority Data

Jun. 17, 1998 (DE) .......................................... 198 26 642

(51) Int. Cl.[7] .............................................. F16K 27/00
(52) U.S. Cl. ........................................ 137/884; 137/544

(58) Field of Search .................................. 137/544, 884; 261/DIG. 35

(56) References Cited

U.S. PATENT DOCUMENTS

| | | | |
|---|---|---|---|
| 3,703,069 A | | 11/1972 | Wheeler |
| 3,848,626 A | * | 11/1974 | Smith et al. ................. 137/269 |
| 4,174,730 A | * | 11/1979 | Heilmann .................... 137/271 |
| 5,887,623 A | * | 3/1999 | Nagai et al. ................. 137/884 |
| 6,006,603 A | * | 12/1999 | Molnar et al. ................ 73/168 |

FOREIGN PATENT DOCUMENTS

| | | | |
|---|---|---|---|
| DE | 32 11 662 | | 10/1983 |
| DE | 36 06 953 | * | 9/1987 |
| DE | 40 32 515 | | 4/1992 |
| EP | 0 099 969 | | 2/1984 |
| EP | 0 261 711 | * | 3/1987 |

* cited by examiner

Primary Examiner—John Fox
(74) Attorney, Agent, or Firm—Paul Vincent

(57) ABSTRACT

The invention relates to a maintenance device (1) in which the individual functional modules (3–6) are aligned in a vertical direction and the compressed air flows through them in a vertical direction.

19 Claims, 5 Drawing Sheets

DEVICE FOR THE MAINTENANCE OF COMPRESSED AIR SYSTEMS

BACKGROUND OF THE INVENTION

The invention concerns a maintenance device for compressed air systems, comprising at least two functional modules, such as a filter module, a shut-off module, a regulator module, a lubricator module or the like, having a connection for a line carrying the compressed air to be treated, a connection for a line carrying the treated compressed air and, optionally, a connection for electric lines.

EP 261 711 A1, DE 36 06 953 A1 and DE 295 09 073 disclose maintenance devices of the above-mentioned type. These maintenance devices comprise functional modules disposed next to one another and having a plurality of different functions for the compressed air to be treated. These functional modules filter, drain, or lubricate the compressed air to be treated. A certain pressure can also be set. Further functions are feasible. Each of these maintenance devices has the substantial advantage that it can be adjusted to the specific needs of a customer: i.e. it comprises only those functional modules which are required to treat the compressed air in accordance with the specific requirements. These modules are disposed next to one another, in a horizontal direction, and the compressed air to be treated flows through same from the right to the left or vice versa.

A disadvantage thereof is that the piping for the compressed air has to be guided such that the flow always approaches the maintenance device from a predetermined side, i.e. from the right or left. This may require considerable installation effort.

A further disadvantage consists in that these known maintenance devices are relatively wide in dependence on the number of individual functional modules and thus cannot be easily mounted at any location on the machine.

A further disadvantage is that, when the maintenance device is enlarged, i.e. through addition of further functional modules, the existing pressure lines have to be correspondingly shortened. When functional modules are removed, connection to the existing pressure lines is no longer possible since they are too short and spacers have to be installed.

It is therefore the underlying purpose of the invention to provide a maintenance device which is relatively small and can be easily increased or reduced in size.

SUMMARY OF THE INVENTION

This object is achieved in accordance with the present invention in that all functional modules are disposed vertically, one on top of the other, and are connected to one another.

Through the vertical arrangement, one on top of the other, the width of the maintenance unit is not determined by the number of functional modules but by the width of the functional modules. Modification of the maintenance device through addition of further functional modules or by removing individual functional modules does not change the connection configuration, position or installation plan of the compressed air lines since the compressed air lines are guided to the maintenance device in a horizontal direction. The lines do not have to be shortened or lengthened since the width of the inventive maintenance device, i.e. its horizontal size, is not changed rather the height, i.e. its vertical extent. The maintenance device in accordance with the invention is relatively narrow. It can therefore be easily mounted to machines, in particular, a machine support or the like, since supports or tables of this type are sufficiently wide to accommodate such a maintenance device. Clearly, the maintenance device can also be mounted to a wall.

In accordance with a preferred embodiment, the connection for the line carrying the compressed air to be treated and the connection for the line carrying the treated air are provided on a common functional module. This functional module is the connection piece to which all pneumatic and, optionally, electric lines are connected. Further functional modules are then connected to this functional module in a vertical and generally downward direction, with the exception of pneumatic and electric connections.

In one embodiment, the pneumatic connections may be opposite to one another or, in another embodiment, may be provided on the same side surface. The functional module preferably comprises one connection on each of the two opposite side surfaces for the line carrying the compressed air to be treated. Such maintenance devices can be universally used, since the compressed air lines can be introduced from either side and the compressed air lines (inlet and outlet air lines) must not be re-installed or adapted to the air guidance configuration of the maintenance device. The inlet air line and the outlet air line may be connected e.g. on the left side or both on the right side or the inlet air line may be connected on the left side and the outlet air line on the right side or the inlet air line may be connected on the right side and the outlet air line may be connected on the left side. The connections on the functional module which are not required are plugged closed.

In a further development, the rear side of the functional module is provided with at least one of the connections. This allows one or the other or both pressure lines to be introduced from the rear side.

In an embodiment, the functional modules comprise at least one coupling flange via which they can be connected to a further functional module, wherein the coupling flange comprises a transfer opening for the compressed air to be treated and a transfer opening for the completely or partially treated compressed air and, in particular, a portion of an electric plug connection. The compressed air is transferred from one functional module to another via the transfer openings, wherein the functional modules are, in turn, provided with a preferably vertically extending air line. This air line preferably terminates on the upper side and lower side of the functional module. Untreated compressed air can pass through the functional module or air can pass through the corresponding treatment station. The individual functional modules are thereby coupled to a bus system to considerably simplify the structure of individual maintenance devices and to reduce the electric wiring to a minimum.

One embodiment provides for a functional module, in particular a filter module, which is structured as a conversion module into which the compressed air to be treated flows vertically from the top, is deflected and exits at the top. This filter module can be operated with and without a filter, wherein with inserted filter, the compressed air has been filtered before flowing out. This functional element is generally the last element which terminates the maintenance device in the vertical direction and no further functional element is added to this functional element. Further functional elements can be installed before this functional element, i.e. between the connection organ and the filter module, such that the filter module once more constitutes the last element.

One variant provides that at least one functional module has a distributor connection. This distributor connection forms a branch such that compressed air can be branched off from the system. Therein, the distributor connection can be coupled to the air line within the functional module before or after the functional element such that either the treated or untreated air can be branched off.

In a preferred fashion, all functional elements comprise such a distributor connection such that, depending on the requirements, air can be branched off from any section of the maintenance device without great installation effort.

In one embodiment, the air line is configured and the functional modules are disposed such that the air is treated in a vertical direction from the bottom to the top. This means that when the compressed air to be treated has been inlet, it is first guided through all functional elements to the lowermost functional element and then, starting with the lowermost functional element, is then treated within the individual functional elements in rising sequence, wherein the completely treated compressed air exits the maintenance device at the uppermost functional element.

A preferred embodiment provides that an installation module, comprising the connections for the compressed air to be treated, for the treated compressed air, and the connection for the electric lines, constitutes a connection element whose lower side has a coupling flange and which has insertion elements and/or a display unit which, in particular, also accommodates the further functional elements. This installation module also serves for connecting all pneumatic and electric lines and is optionally also provided with fastening means such that the maintenance device can be mounted e.g. to a machine support or to a wall. The individual functional modules are coupled to this installation module from below, which does not impact on the pneumatic and electric connections. These further functional modules are adjusted using the installation module which, in turn, comprises insertion elements and/or a display unit, e.g. a LCD screen for this purpose.

In a preferred fashion, only this installation module is provided with fastening means such that the further functional modules can be easily removed from the maintenance device for revision, maintenance and/or repair without having to remove the maintenance device.

A preferred embodiment provides that the connection for the compressed air to be treated, the connection for the treated compressed air and optionally the connection for electric lines is provided on one of the functional modules.

Further advantages, features and details of the invention can be extracted from the dependent claims and the following description showing, in detail, a preferred embodiment. The features shown in the drawing and disclosed in the claims and the description may be essential for the invention either individually or collectively in any arbitrary combination.

DESCRIPTION OF THE PREFERRED EMBODIMENT

Figure 1:
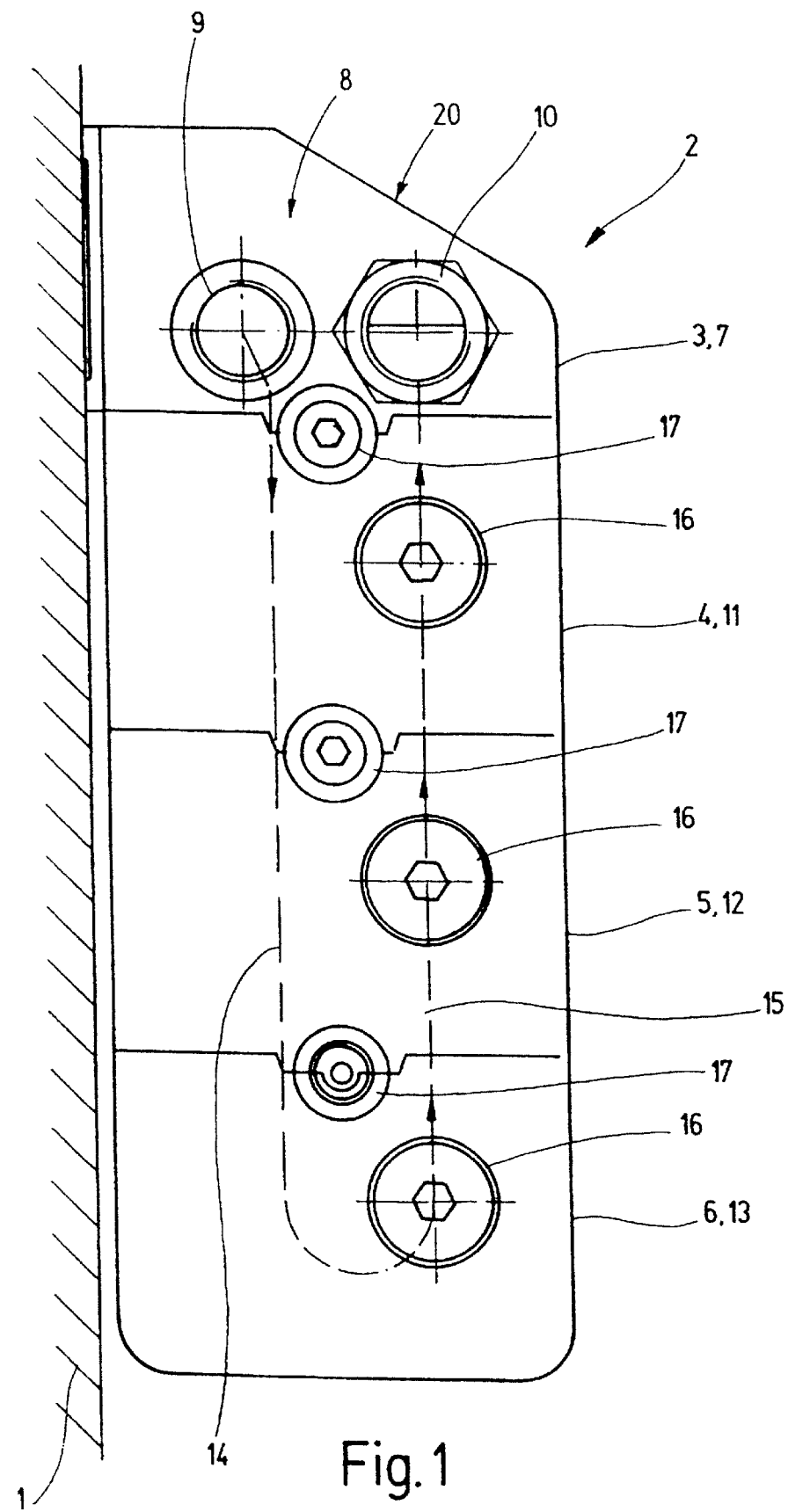
FIG. 1 shows a schematic side view of a first embodiment of a maintenance device.

FIG. 1 schematically illustrates a wall 1 to which a maintenance device, designated in its totality with 2, is mounted, wherein the maintenance device 2 has a total of four functional modules 3, 4, 5 and 6. The uppermost functional module 3, formed as installation module 7, is mounted to the wall 1 using e.g. screws (not shown). This installation module 7 has two connections 9 and 10 on the side wall 8 or side surface facing the observer. A line 25 (FIG. 3) guiding the compressed air to be treated is connected to the connection 9 and a line 26 (FIG. 3) carrying the treated compressed air is connected to the connection 10. The compressed air thereby enters into and exits from the functional module 3 at the same side, i.e. the side wall 8.

The side wall (not shown) opposite to the side wall 8 also comprises two connections such that the lines 25 and 26 guiding the compressed air can be alternatively connected to this side wall. It is also possible to connect one line 25 or 26 to the side wall 8 and the other line 26 or 25 to the opposite side wall.

A pulsed lubricator module 11 is located below the installation module 7 and an EP regulator module 12, comprising a switch-on valve and soft start, is disposed below the pulsed lubricator module 11. The lowermost functional module 12 is a filter module 13 comprising a pre-filter and superfine filter. Flow passes from the top to the bottom through the functional modules 3 to 6 via an air line 14 disposed in the rear area, wherein the compressed air in the filter module 13 is deflected to the top. The air thereby flows through a filter provided in the filter module 13. Flow passes in the forwardly disposed air line 15 through the individual functional modules 3 through 5 from the bottom to the top, wherein the air is treated in each functional module.

FIG. 1 also shows that the functional modules 4 to 6 comprise distributor connections 16 on their side walls by means of which part of the compressed air can be branched off. The side walls are furthermore provided with coupling elements 17 via which the individual functional modules 3 to 6 can be interconnected.

Figure 2:
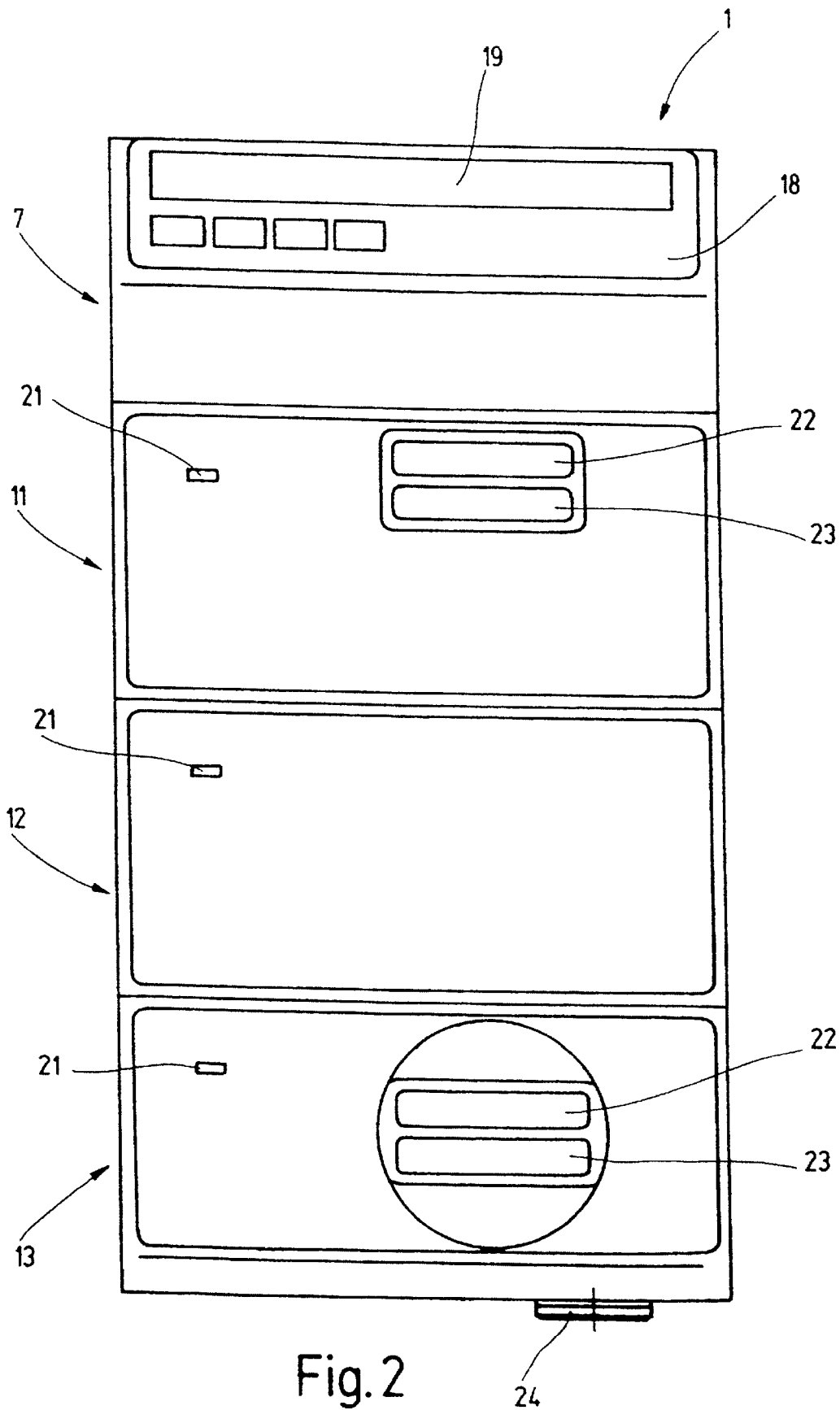
FIG. 2 shows a front view of the maintenance device.

FIG. 2 shows the front view of the maintenance device 2, wherein the installation module 7 has an operation board 18 with a display unit 19. The operation board and the display unit are located at an ergonomically favorable position on a surface 20 inclined towards the front (FIG. 1). The pulsed lubricator module 11 is located below this installation module 7 and comprises an operation display 21 and further display elements 22 and 23 e.g. for the operational condition and the oil supply. The EP regulator module 12 also has an operation display 21. The set regulator pressure can be adjusted on the operation board 18 and can be displayed or read on the display element 19. Low pressure compressed air can be branched off via the distributor connection 18.

The filter module 13 also comprises an operation display 21 and display elements 22 and 23. The lower side of the filter module 13 is provided with an outlet stopper 24 e.g. for water.

Figure 3:
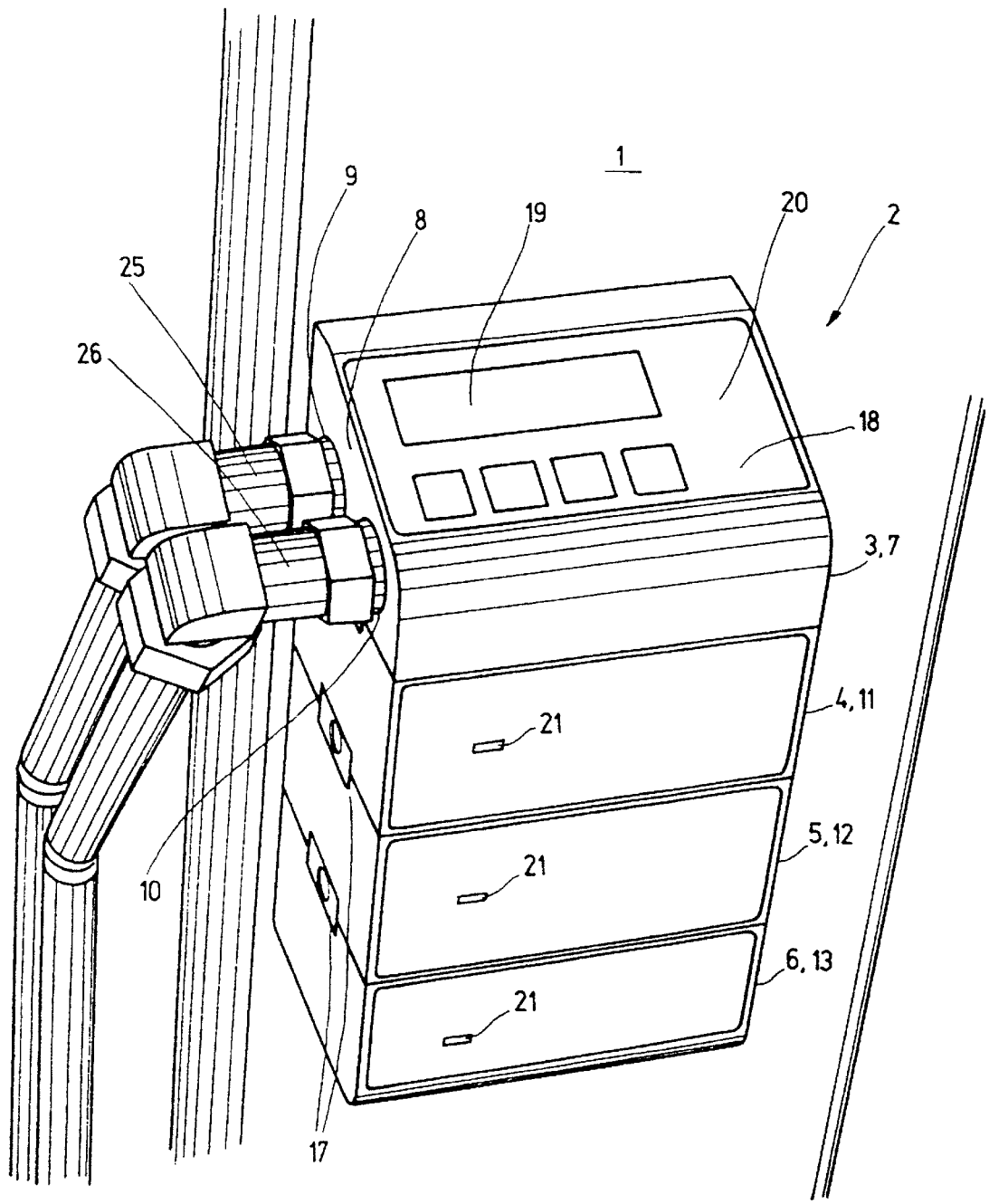
FIG. 3 shows a perspective view of another embodiment of a maintenance device.

FIG. 3 shows a perspective view of the maintenance device 2, wherein only the coupling elements 17 have an alternative shape. The two compressed air lines 25 and 26 are connected to the connections 9 and 10 at the same side wall. It is clearly shown that further functional modules can be easily coupled below the installation module 7 and above the functional module 6 or the filter module 13 without having to dismount the entire maintenance device 2 from the compressed air lines 25 and 26 or from the wall 1. The installation or length of the compressed air lines 25 and 26 must not be modified. This also applies should one of the functional modules be removed. Since the compressed air lines 25 and 26 can be connected to the visible side wall 8 and also to the opposite side wall or also to the rear side of the installation module 7, the maintenance device 2 can be universally used and the compressed air lines 25 and 26 can be connected as required. Existing installations must not be modified.

Figure 4:
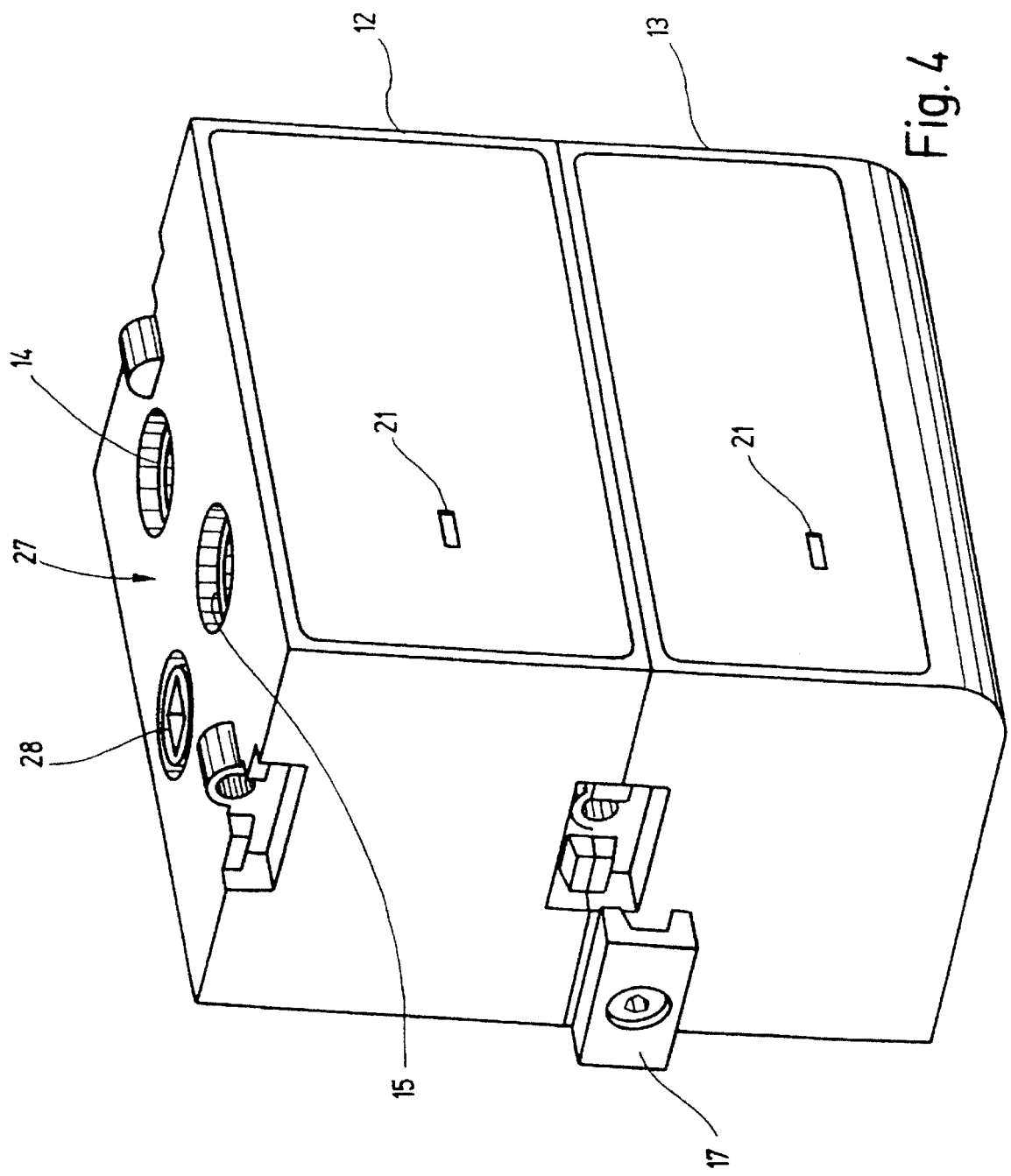
FIG. 4 shows a perspective view of a lower section of the maintenance device in accordance with FIG. 3.

FIG. 4 shows the EP regulator module 12 and the filter module 13 which are connected to one another via the coupling element 17. The upper side of the EP regulator module 12 is formed by a coupling flange 27 into which the two air lines 14 and 15 feed. Part of an electric plug connection 28 is also visible by means of which the electric lines of the individual functional modules can be connected to one another.

Figure 5:
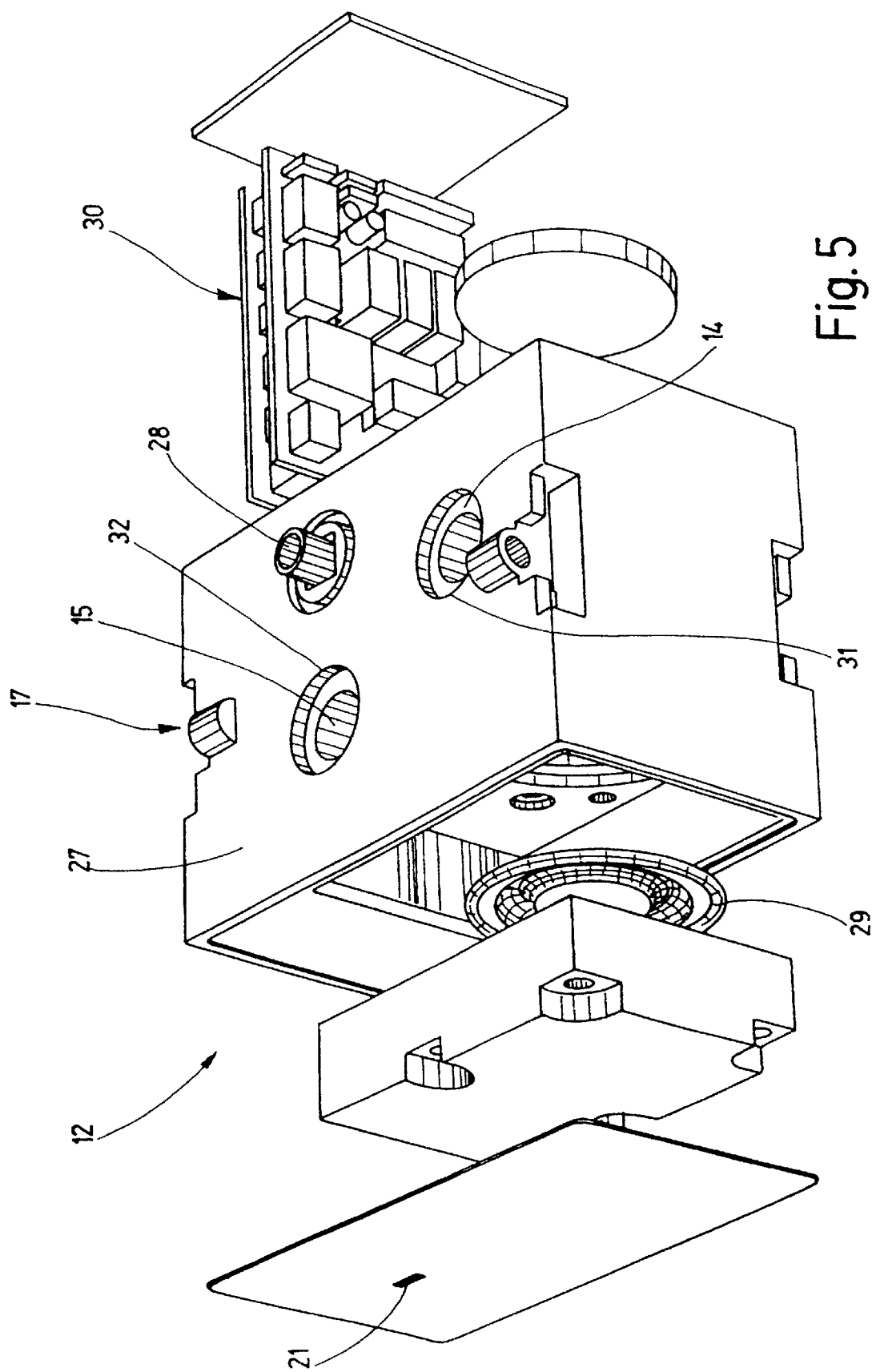
FIG. 5 shows an exploded view of a functional module.

FIG. 5 shows the EP regulator module 12. Visible are, in particular, the diaphragm 29, via which the desired pressure is adjusted, and the electronics 30. The two air lines 14 and 15 open into the coupling flange 27 at transfer openings 31 and 32. Sealing is achieved via rubber seals (e.g. O-rings or the like, not shown).

One sees that the individual functional modules 3 to 6 are disposed one on top of the other in a vertical direction and the compressed air to be treated as well as the treated compressed air are guided in an essentially vertical direction within the functional modules 3 through 6. When the maintenance device 2 is extended or if a functional module is removed, only the vertical size of the maintenance device changes. The width of the maintenance device 2 and in particular the connections 9 and 10 remain, in any event, unchanged.

We claim:

1. A maintenance device for compressed air systems, the device comprising:

a first functional module, said first functional module having at least one first coupling flange, said first coupling flange having a first transfer opening for compressed air to be treated and a second transfer opening for treated compressed air; and at least one additional second functional module said second functional module disposed in vertical alignment with and connected to said first functional module, said second functional module having at least one second coupling flange having a third transfer opening for compressed air to be treated and a fourth transfer opening for treated compressed air, wherein at least one of said first functional module and said second functional module has at least one of a first connection for a first line carrying compressed air to be treated and a second connection for a second line carrying treated compressed air.

2. The device of claim 1, wherein at least one of said first functional module and said second functional module is one of a filter module, a shut-off module, and a regulator module, and further comprising a first electric plug connection disposed in said first coupling flange and a second electric plug connection disposed in said second coupling flange.

3. The maintenance of claim 1, wherein both said first connection and said second connection are disposed in one of said first and said second functional module.

4. The maintenance device of claim 3, wherein said first connection faces said second connection.

5. The maintenance device of claim 3, wherein said first connection and said second connection are disposed on a same side wall.

6. The maintenance device of claim 3, wherein each of side walls facing one another comprise at least one of said first and said second connections.

7. The maintenance device of claim 3, wherein at least one of said first and said second connections is disposed on a rear module wall.

8. The maintenance device of claim 1, wherein said first functional module and said second functional module each comprise a vertically extending air line.

9. The maintenance device of claim 8, wherein said air line feeds into an upper module side and a lower module side.

10. The maintenance device of claim 1, wherein a lowermost functional module is a deflection module into which compressed air to be treated flows vertically from above, is deflected, and exits in an upward direction.

11. The maintenance device of claim 10, wherein said deflection module is a filter module.

12. The maintenance device of claim 1, wherein at least one of said first and said second functional module comprises a distributor connection.

13. The maintenance device of claim 1, wherein air treatment is carried out in a vertically ascending direction, beginning at a lowermost functional module.

14. The maintenance device of claim 3, wherein said first connection and said second connection are disposed on an installation module, said installation module further comprising an electric lines connection, wherein one of said first coupling flange and said second coupling flange is disposed on a lower side of said installation module, said installation module further comprising at least one of adjusting elements, an operation board and a display unit.

15. The maintenance device of claim 14, wherein said at least one of said adjusting elements, said operation board and said display unit communicates with all functional modules.

16. The maintenance of claim 14, wherein said installation module comprises fastening means.

17. The maintenance device of claim 16, wherein only one functional modules comprises said fastening means.

18. The maintenance device of claim 1, wherein said first connection, said second connection, and an electric plug connection are all disposed on one functional module.

19. The maintenance device of claim 1, further comprising a field bus system for transfer of electric signals via electric lines.

* * * * *